United States Patent
O'Bryan et al.

(10) Patent No.: US 8,780,336 B2
(45) Date of Patent: Jul. 15, 2014

(54) FIBER OPTIC SENSORS WITHIN SUBSURFACE MOTOR WINDING CHAMBERS

(71) Applicant: Baker Hughes Incorporated, Houston, TX (US)

(72) Inventors: Suresha R. O'Bryan, Cypress, TX (US); Katankumar K. Sheth, Tulsa, OK (US); Michael C. Nuckels, Christianburg, VA (US)

(73) Assignee: Baker Hughes Incorporated, Houston, TX (US)

(*) Notice: Subject to any disclaimer, the term of this patent is extended or adjusted under 35 U.S.C. 154(b) by 0 days.

(21) Appl. No.: 13/971,583

(22) Filed: Aug. 20, 2013

(65) Prior Publication Data

US 2014/0161637 A1    Jun. 12, 2014

Related U.S. Application Data

(63) Continuation-in-part of application No. 13/314,010, filed on Dec. 7, 2011, now Pat. No. 8,537,364.

(51) Int. Cl.
*G01B 11/16* (2006.01)
*E21B 47/01* (2012.01)
*E21B 49/00* (2006.01)
*E21B 47/00* (2012.01)

(52) U.S. Cl.
CPC ............ *G01B 11/16* (2013.01); *E21B 47/0006* (2013.01)
USPC ...... 356/32; 166/250.11; 166/66; 166/250.17

(58) Field of Classification Search
CPC combination set(s) only.
See application file for complete search history.

(56) References Cited

U.S. PATENT DOCUMENTS

| | | | |
|---|---|---|---|
| 6,888,124 B1 | 5/2005 | Smith | |
| 6,913,079 B2 | 7/2005 | Tubel | |
| 7,208,855 B1 | 4/2007 | Floyd | |
| 7,504,752 B2 | 3/2009 | Head | |
| 2003/0236626 A1 | 12/2003 | Schroeder et al. | |
| 2004/0141420 A1 | 7/2004 | Hardage et al. | |
| 2007/0041019 A1 | 2/2007 | Schmidt | |
| 2007/0272406 A1 | 11/2007 | McCoy et al. | |
| 2009/0065202 A1 | 3/2009 | Brown et al. | |
| 2011/0002795 A1* | 1/2011 | Brookbank | 417/63 |
| 2011/0061862 A1* | 3/2011 | Loretz et al. | 166/250.11 |
| 2011/0139447 A1 | 6/2011 | Ramos et al. | |
| 2012/0026482 A1 | 2/2012 | Dailey | |
| 2012/0073804 A1 | 3/2012 | Harman et al. | |
| 2012/0179378 A1* | 7/2012 | Duncan et al. | 702/8 |

* cited by examiner

*Primary Examiner* — Michael P Stafira
(74) *Attorney, Agent, or Firm* — Shawn Hunter (57) ABSTRACT

A motor assembly for a submersible pump which includes capability of detecting or monitoring one or more operating parameters for the motor, including temperature, pressure and strain.

19 Claims, 6 Drawing Sheets

FIBER OPTIC SENSORS WITHIN SUBSURFACE MOTOR WINDING CHAMBERS

BACKGROUND OF THE INVENTION

1. Field of the Invention

The invention relates generally to motors of the type that are used within electrical submersible pumps (ESP's). In particular aspects, the invention relates to subsurface motors having fiber optic measurement or monitoring capabilities.

2. Description of the Related Art

Electrical submersible pumps (ESPs) are routinely used in the production of hydrocarbon from wells. A typical ESP includes a downhole motor that converts the mechanical power to operate a pump and associated components, such as a gas is separator. Downhole motors include a stator and a rotor that is rotationally moveable with respect to the stator. A housing surrounds the stator and rotor.

The use of fiber optic sensors within subsurface motors of this type is discussed in U.S. Pat. No. 6,888,124. The use of fiber optic sensors within the sealed winding chambers of the stator of the motor is discussed in U.S. Patent Publication No. 2011/0002795 by Brookbank. Because U.S. Patent Publication No. 2011/0002795 is owned by the assignee of the present application, U.S. Patent Publication No. 2011/0002795 is herein incorporated by reference in its entirety. Brookbank, the optic fibers are located within the winding chambers alongside electrical conductors that pass through the winding chambers. The fiber is disposed through the winding chambers by looping it through substantially opposing sides of the stator. This permits the fiber to provide two parallel legs. Bending or deformation of the stator will place one of the opposing legs in tension and the other in compression. Optical discontinuities on each of the legs will be moved axially, and the detection of this relative axial movement allows measurement of bending or deformation of the stator.

The winding chambers of a stator are typically filled with an epoxy sealant during manufacture in order to seal in the winding wiring in place. The inventors have concludes that this sealing largely precludes the operation of these optic fibers to perform single point or distributed point sensing of operational parameters. Also, it is difficult to remove and replace a fiber from the winding compartment due to epoxy sealing.

SUMMARY OF THE INVENTION

The present invention provides methods for detecting operational parameters associated with a motor that is used within an ESP. The operational parameters that are detected can include temperature, pressure, and vibration. Optic fibers are used in conjunction with surface-based processing equipment that can record and store data provided by the optic fibers. In certain embodiments, optic fibers are used that provide for single point sensing or, alternatively, distributed multi-point sensing.

In described embodiments, fibers or fiber optic bundles are located within unsealed portions of the winding compartments of the stator. In one embodiment, a winding compartment is lined with a layer of insulation, and a fiber or fiber bundle is disposed between the layer of insulation and the wall of the winding compartment. In another described embodiment, a winding compartment is lined with multiple layers of insulation. A fiber or fiber bundle is disposed within the winding compartment in between adjacent layers of insulation.

In the described embodiments, the optical fibers and/or fiber bundles are disposed in a largely axial orientation with respect to the motor. As a result, the fibers/fiber bundles are able to obtain data at one or more points along the axis of the motor. Suitable Bragg gratings may be placed at intervals or predetermined locations along the length of each fiber which are suited to detect particular operational parameters.

In preferred embodiments, optic fibers or fiber bundles that are incorporated into the motor are passed through an epoxy fixture located at the lower end of the motor and, thereafter, into a fiber management bowl wherein the fibers can be spliced to join a fiber optic cable that leads to the surface of the well.

The optic fibers/bundles are disposed through openings in a fixture that is affixed to the lower end of the motor and enter a fiber management bowl below the fixture. The fiber management bowl allows the fibers to be spliced together with a fiber optic cable that extends from the fiber management bowl to surface-based data processing equipment.

BRIEF DESCRIPTION OF THE DRAWINGS

For a thorough understanding of the present invention, reference is made to the following detailed description of the preferred embodiments, taken in conjunction with the accompanying drawings, wherein like reference numerals designate like or similar elements throughout the several figures of the drawings and wherein.

DETAILED DESCRIPTION OF THE PREFERRED EMBODIMENTS

Figure 1:
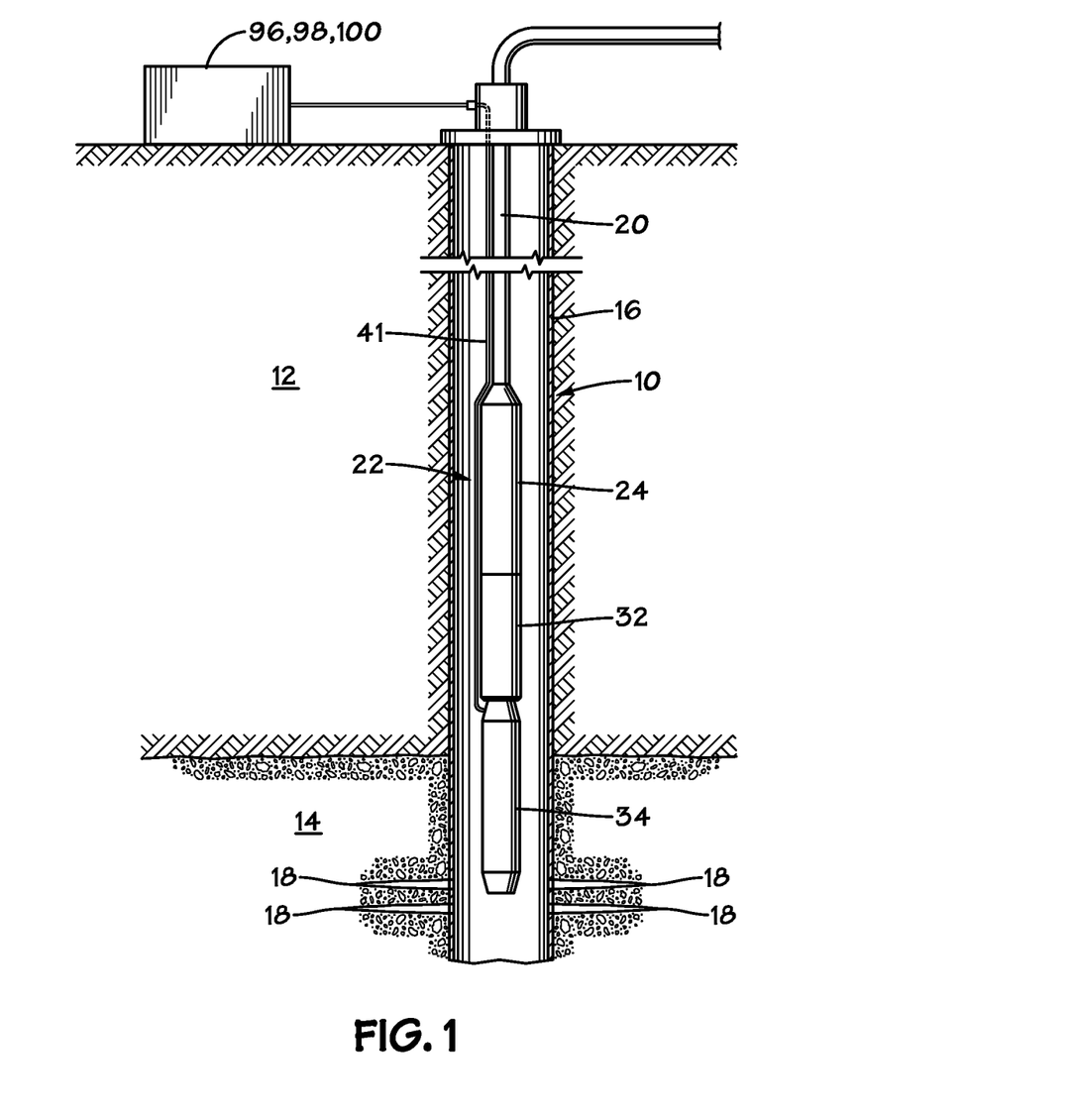
FIG. 1 is a side, cross-sectional view of an exemplary wellbore containing an electric submersible pump.

FIG. 1 depicts an exemplary wellbore 10 that has been drilled through the earth 12 down to a subterranean hydrocarbon formation 14. The wellbore 10 has metallic casing 16 of a type known in the art. Perforations 18 are disposed through the casing 16 and into the formation 14.

Production tubing 20 is disposed within the wellbore 10, having been run in from the surface in a manner known in the art. The production tubing 20 may be a string of production tubing members that are interconnected by threaded or it may be coiled tubing. An electric submersible pump (ESP) assembly 22 is affixed to the lower end of the production tubing 20. The exemplary ESP assembly 22 includes a centrifugal pump 24 which is affixed at its lower end to either a seal section 32 or a gas separator (not shown).

A seal section 32, of a type known in the art, interconnects the lower end of the pump 24 to a motor 34. The motor 34 is of a type known in the art and may be a three-phase electrical motor. The seal section 32 is also of a type known in the art and is capable of equalizing the pressure of the lubricant contained within the motor 34 with well fluid on the exterior of motor 34.

Figure 5:
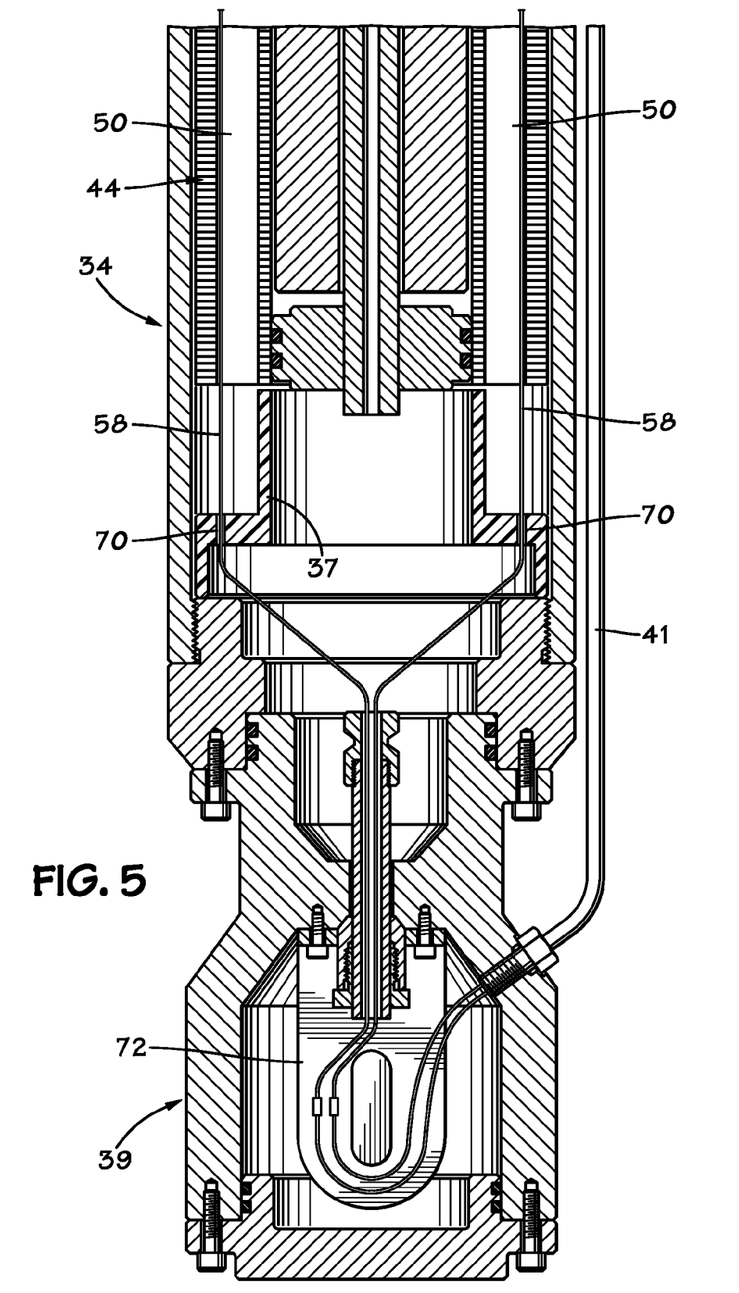
FIG. 5 illustrates the lower end of an exemplary motor and associated components.

Further details relating to the construction and operation of electric submersible pump assemblies and gas separators can be found in U.S. Patent Publication No. US 2009/0065202 which is owned by the assignee of the present application. U.S. Patent Publication No. US 2009/0065202 is hereby incorporated by reference in its entirety. Referring to FIG. 5, a cylindrical fixture 37 and a fiber management bowl 39 are affixed to the lower end of the motor 34. A fiber optic cable 41 extends from the fiber management bowl 39 to the surface of the wellbore 10. Additionally, one or more optic fibers extend from the motor 34 through the fixture 37 and into the fiber management bowl 39.

Figure 2:
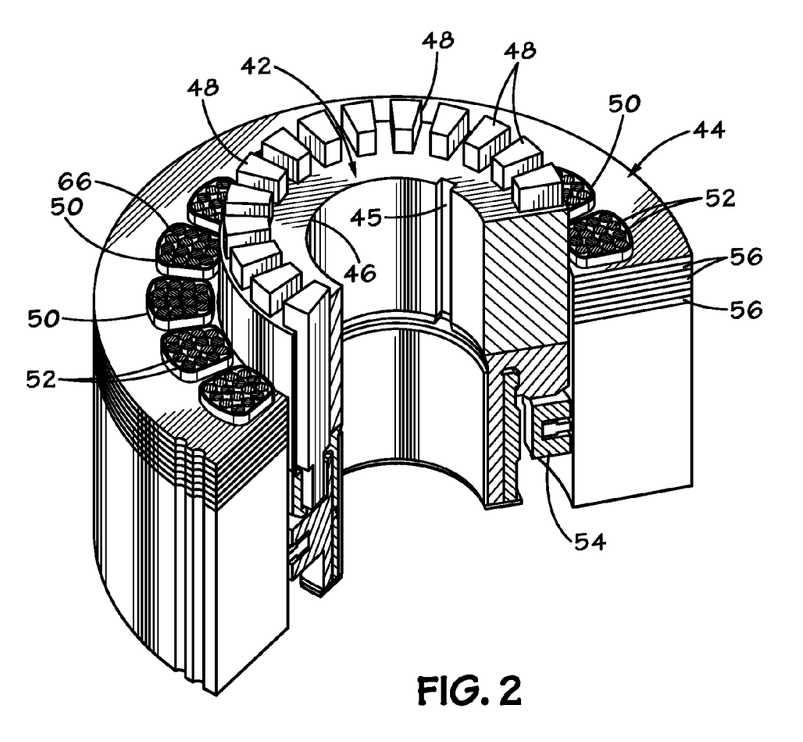
FIG. 2 is an isometric view of an exemplary downhole motor, partially cut away, and depicting an exemplary placement of fiber optics for measurement of operational parameters in accordance with the present invention.

FIG. 2 depicts internal portions of the motor 34. The motor 34 includes a central rotor 42 and a generally cylindrical stator 44 that radially surrounds the rotor 42. During operation, the rotor 42 rotates with respect to the stator 44. The rotor 42 is generally cylindrical in shape and encloses a central bore 46. Magnetic elements 48, such as copper cores, are disposed within the rotor 42. Axial electric winding compartments 50 are formed within the stator 44 and contain wires 52 that form the winding. A rotary bearing 54 is provided between two rotors 42 or between shaft (not shown) and stator 44. The central bore 46 of the rotor 42 includes a keyway 45 that is shaped and sized to be engaged by a complementary key on rotary motor shaft (not shown). It is noted that the stator 44 is typically formed of a number of thin plates, known as laminations 56 that are stacked and secured to each other.

Figure 3:
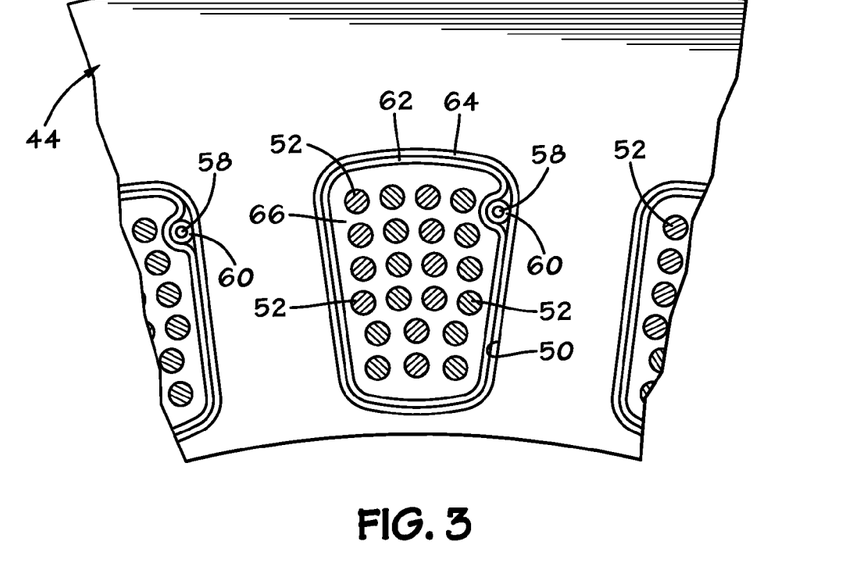
FIG. 3 is a detail drawing illustrating exemplary placement of optic fibers within a stator winding compartment of a motor.
Figure 4:
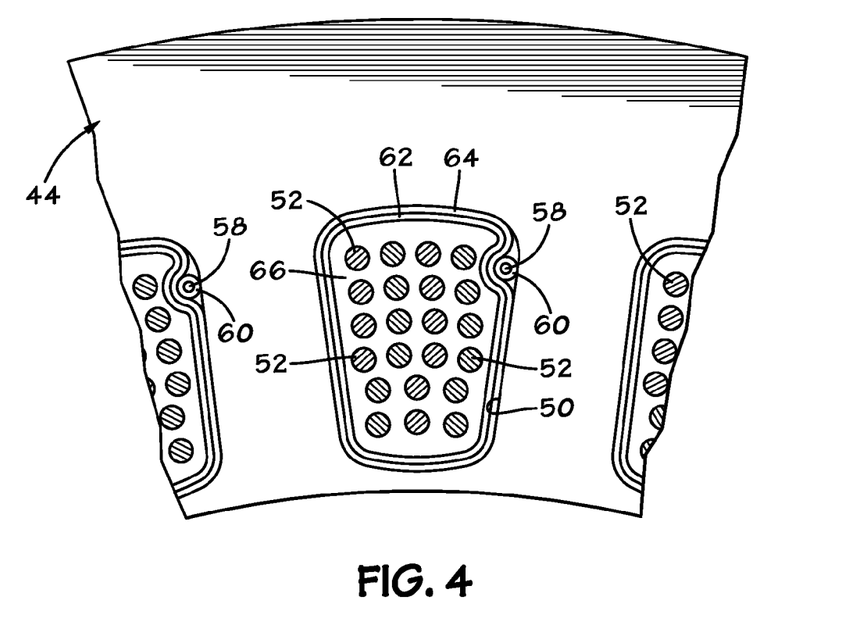
FIG. 4 is a detail drawing illustrating an alternative exemplary placement of optic fibers within a stator winding compartment of a motor.

FIGS. 3 and 4 depict exemplary placements of optic fibers within a stator winding compartment 50. FIG. 3 shows optic fiber 58 and surrounding isolation tube 60 disposed in between the insulation layers 62, 64. It is noted that 58 might also be a bundle of individual optic fibers rather than a single fiber. A single fiber is depicted for clarity. FIG. 4 shows fiber 58 and surrounding isolation tube 60 disposed between the outer insulation layer 64 and the wall of the winding compartment 50.

To construct motor 34 having the fiber configurations shown in FIG. 3 or 4, individual laminates 56 are affixed to each other to form the stator 44 with winding compartments 50. The compartments 50 are then lined with layers of insulation 62, 64. If a fiber or fiber bundle 58 is to be placed in between layers of insulation 62, 64 (FIG. 3) or between the outer layer of insulation 64 and the wall of compartment 50 (FIG. 4), then an isolation tube 60 is inserted into the compartment 50 during placement of the insulation layers 62, 64. The electrical conductor wires 52 are wound inside the slot formed by the insulation layers 62, 64 in the axial direction. Fiber is inserted in the isolation tube 60 before and/or after the winding is completed. The compartments 50 are then filled with epoxy or varnish 66. The epoxy/varnish 66 is then cured by heating the assembled stator 44 to a predetermined curing temperature. In preferred embodiments, the fiber or fiber bundle 58 is inserted into an isolation tube 60 by injection.

FIG. 5 depicts the lower end of the motor 34 which includes a cylindrical fixture 37. The fixture 37 is typically formed of epoxy and/or varnish and functions to collect and organize the winding wires 52, which are not shown in FIG. 5 for clarity. Optic fibers/fiber bundles 58 and are disposed through openings 70 in the fixture 37.

The fiber management bowl 39, which is affixed to the lower end of the motor 34 contains a splice tray 72 which permits the individual fibers or fiber bundles to be jo incorporated into fiber optic cable 41. A suitable fiber management bowl for use in this application is the SUREVIEW™ ESP Optical Stinger that is available commercially from Baker Hughes Incorporated of Houston, Tex.

Figure 6:
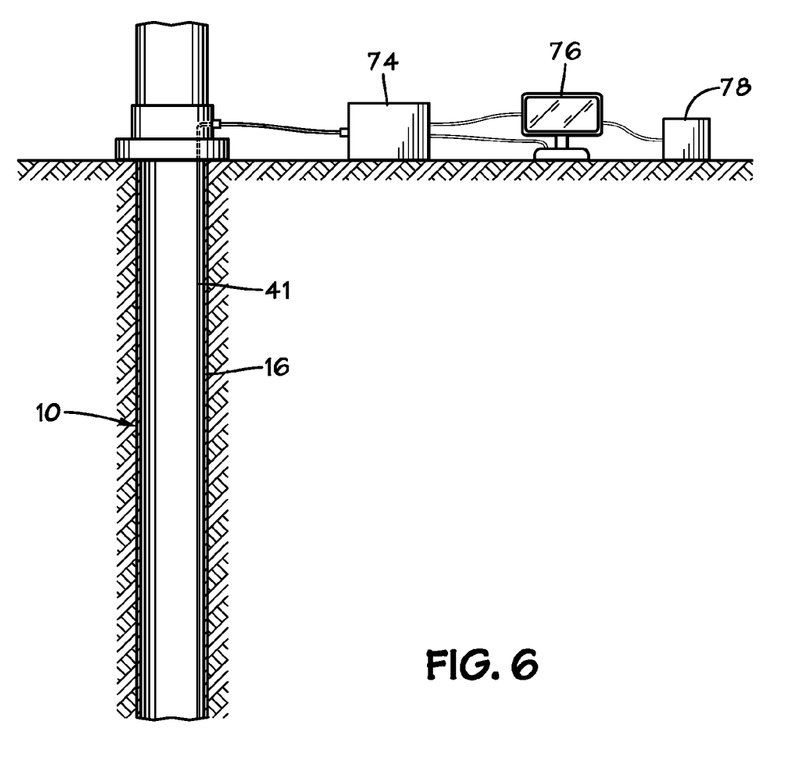
FIG. 6 illustrates surface-based equipment that is operably associated with fiber optic sensors.

FIG. 6 illustrates exemplary surface-based equipment to which the fiber optic cable 41 might be routed. The fiber optic cable 41 is operably interconnected with a is fiber optic signal processor 74. The fiber optic signal processor 74 typically includes an optical time-domain reflectometer (OTDR) which is capable of transmitting optical pulses into the fiber optic cable 41 and analyzing the light that is returned, reflected or scattered therein. Changes in an index of refraction in the optic fiber 58 can define scatter or reflection points. Analyzing the collected return light can yield the distance to changes in the index of refraction. Thus, the OTDR can be used to detect the locations of sensed operating parameters along the length of the optic fiber 58.

In some embodiments, a suitable display 76 and recording device 78 are also associated with the signal processor 74. Generally, the fiber optic signal processor 74 is a computer or microprocessor chip that is programmed to analyze an optical signal and send information relating to the optical signal to recordable storage in the recording device 78. The fiber optic signal processor 74 can include signal processing software for generating a signal or data representative of the measured conditions.

Figure 7:
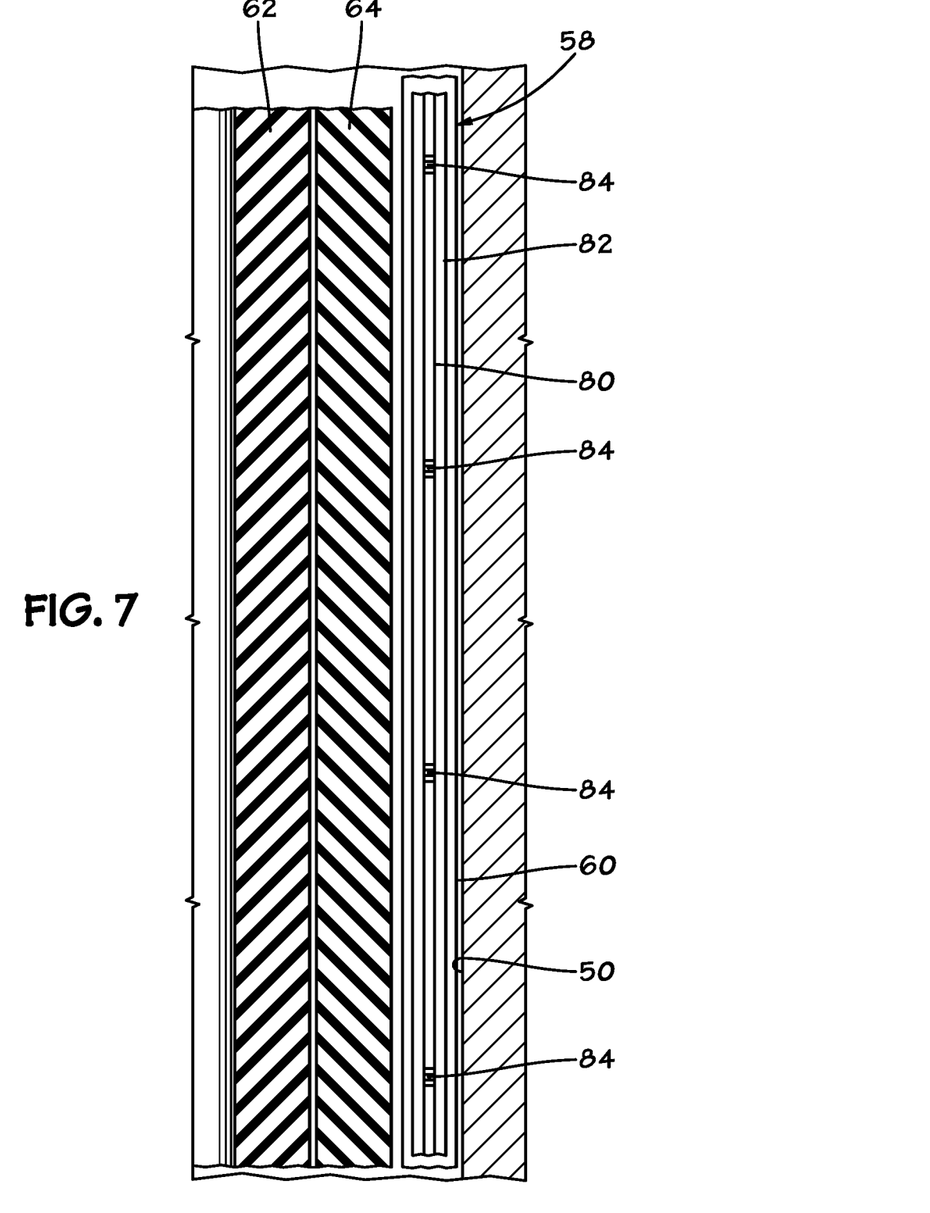
FIG. 7 illustrates an exemplary distributed sensor arrangement that could be used within the motor shown in FIGS. 2-5.

It is noted that the optic fibers/fiber bundles 58 may be used to detect an operational parameter associated with the motor 34. The operational parameters that are detected can include temperature, pressure, and vibration. In certain embodiments, optic fibers are used that provide for single point sensing or, alternatively, distributed multi-point sensing. In particular embodiments, Bragg gratings are provided along the length of the optic fibers. FIG. 7 illustrates an exemplary optic fiber 58 within protective tube 60 disposed within a winding chamber 50. The fiber 58 includes a core 80 and surrounding cladding 82. Bragg gratings 84 are formed on the core 80 of the fiber 58. As is known, Bragg gratings 84 can be created by etching or inscribing changes to the refractive index of the core 80 of the fiber 58. Bragg gratings 84 may be created using UV laser or UV light in conjunction with a specific photomask to form a particular grating pattern. Each Bragg grating 84 functions as a sensor that exhibits a particular resonance feature which is tracked as the fiber is subjected to strain or to temperature variations. Each Bragg grating 84 responds to a broadband optical signal (typically provided by the signal processor 74) and further responds to the parameter being sensed in order to provide a signal containing information about the parameter being sensed. As an optical pulse is provided to the fiber 58 by the signal processor 74, light is continuously backscattered as it propagates, as a result of Rayleigh scattering. The backscattered light is time-resolved by the signal processor 74 to provide a differential map of the spatial distribution of optical attenuation along the fiber 58.

There are multiple Bragg gratings 84, which permits a selected parameter to be measured at multiple, discrete points within the winding chamber 50. In a particular exemplary embodiment, temperature is detected by each of the Bragg gratings 84 along the fiber 58, which will provide to an operator an indication of discrete hot spots along the axial length of the stator 44. This indication may be used by the operator to take action to prevent potential overheating. According to an alternative embodiment, the Bragg gratings 84 are adapted to detect pressure or changes in pressure within the motor 34. The sensed data will provide an indication of the location(s) of high pressure areas along the length of the motor 34. In yet another alternative embodiment, the Bragg gratings 84 are adapted to sense strain. Discrete distributed point measurements of strain along the length of the stator winding chamber 50 can provide indications of vibration within the motor 34 and provide the locations of excessive vibration within the motor 34. Multiple fibers 58 may be emplaced within the winding chamber 50, each of which detects a different specific operating parameter.

When the optic fiber or optic fiber bundle 58 is to be located within a stator winding chamber 50, a protective tubing 60 is disposed within certain locations within the stator winding chamber 50. The tubing 60 may or may not contain optic fibers or fiber bundles 58 at this point. Insulation laminates 62 and/or 64 are installed within the stator winding compartment 50. The electrical conductor wires 52 are wound inside the slot formed by the insulation layers 62, 64 in the axial direction. Fiber is inserted in the isolation tube 60 before and/or after the winding is completed. The compartment 50 is then filled with epoxy or varnish 66 which is then cured, securing the protective tubing 60 in place. Alternatively, if needed, fibers or fiber bundles 58 are then injected into empty protective tubing 60 to extend them axially through the motor 34. It is noted that the fiber 58 may be readily removed from the stator winding chamber 50 and replaced since it is not sealed in with epoxy 66.

The optic fibers/bundles 58 described above are disposed through openings in a fixture 37 that is affixed to the lower end of the motor 34 and enter a fiber management bowl 39 below the fixture 37. The fiber management bowl 39 allows the fibers to be spliced together with a fiber optic cable 41 that extends from the fiber management bowl 39 to surface-based data processing equipment 96, 98, 100.

It should be appreciated that the invention provides a motor assembly for an electric submersible pump wherein the motor assembly includes a rotor 42 and a stator 44 having at least one winding chamber 50 that is lined with at least one layer of insulation 62/64. In accordance with the invention, an optic fiber sensor 58 is disposed within a winding chamber 50 proximate the interior wall of the winding chamber 50. The optic fiber or fiber bundle 58 is separated from the winding wires 52 and epoxy 66 by at least one layer of insulation 62/64. In some embodiments, the optic fiber sensor 58 is disposed between the wall of the chamber 50 and a layer of insulation 62/64. According to other embodiments, the optic fiber sensor 58 is disposed between adjacent layers of insulation 62/64.

It should be appreciated that the invention provides techniques that allow monitoring of operational parameters of a subsurface motor especially in high temperature applications. The inventors have found that fiber optics are relatively insensitive to electromagnetic interference and have a small footprint and high accuracy.

Those of skill in the art will recognize that numerous modifications and changes may be made to the exemplary designs and embodiments described herein and that the invention is limited only by the claims that follow and any equivalents thereof.

What is claimed is:

1. A submersible pump motor assembly comprising:
    a motor having a rotatable rotor and a stator radially surrounding the rotor, the stator having a winding chamber containing a motor winding wire; and
    an optic fiber sensor for detecting at least one operational parameter for a submersible pump motor disposed within the winding chamber and being separated from the motor winding wire by a layer of insulation.

2. The submersible pump motor assembly of claim 1 wherein the optic fiber sensor is disposed between the layer of insulation and an interior wall of the winding chamber.

3. The submersible pump motor assembly of claim 1 wherein the optic fiber sensor is disposed between two layers of insulation.

4. The submersible pump motor assembly of claim 1 wherein the optic fiber sensor is contained within a protective tube.

5. The submersible pump motor assembly of claim 1 wherein the optic fiber sensor includes a fiber core and surrounding cladding and wherein the core has at least one Bragg grating inscribed thereupon.

6. The submersible pump motor assembly of claim 5 wherein there is a plurality of said Bragg gratings formed within the core.

7. The submersible pump motor assembly of claim 1 wherein the at least one operational parameter is from a group of operational parameters consisting essentially of temperature, pressure, and strain.

8. The submersible pump motor assembly of claim 1 further comprising a fiber optic signal processor to analyze light that is returned, reflected or scattered within the optic fiber sensor.

9. A submersible pump motor assembly comprising:
    a motor having a rotatable rotor and a stator radially surrounding the rotor, the stator having a winding chamber containing a motor winding wire;
    an optic fiber sensor for detecting at least one operational parameter for a submersible pump motor disposed within the winding chamber and being separated from the motor winding wire by a layer of insulation; and
    a fiber optic signal processor to analyze light that is returned, reflected or scattered within the optic fiber sensor.

10. The submersible pump motor assembly of claim 9 wherein the at least one operational parameter is from a group of operational parameters consisting essentially of temperature, pressure, and strain.

11. The submersible pump motor assembly of claim 9 wherein the optic fiber sensor is disposed between the layer of insulation and an interior wall of the winding chamber.

12. The submersible pump motor assembly of claim 9 wherein the optic fiber sensor disposed between two layers of insulation.

13. The submersible pump motor assembly of claim 9 wherein the optic fiber sensor is contained within a protective tube.

14. The submersible pump motor assembly of claim 9 wherein the optic fiber sensor includes a fiber core and surrounding cladding and wherein the core has at least one Bragg grating inscribed thereupon.

15. The submersible pump motor assembly of claim 14 wherein there is a plurality of said Bragg gratings formed within the core.

16. A method of constructing a submersible pump motor assembly with fiber optic sensing capability, the method comprising the steps of:
    forming a stator for a submersible pump motor, the stator having a central opening for containing a rotational rotor and at least one winding chamber containing a motor winding wire;
    disposing an optic fiber sensor within the winding chamber; and
    lining the winding chamber with at least one layer of insulation.

17. The method of claim 16 wherein the layer of insulation is disposed between the optic fiber sensor and the motor winding wire.

18. The method of claim 16 further comprising the step of sealing portions of the winding chamber with epoxy sealant.

19. The method of claim 17 further comprising the step of sealing portions of the winding chamber with varnish sealant.

* * * * *